US012542078B2

(12) United States Patent
Weihmann

(10) Patent No.: US 12,542,078 B2
(45) Date of Patent: Feb. 3, 2026

(54) DEVICE FOR A UTILITY VEHICLE STRUCTURE, AND UTILITY VEHICLE STRUCTURE CONSTRUCTED WITH THE SAME

(71) Applicant: Andreas Weihmann, Obernkirchen (DE)

(72) Inventor: Andreas Weihmann, Obernkirchen (DE)

( * ) Notice: Subject to any disclaimer, the term of this patent is extended or adjusted under 35 U.S.C. 154(b) by 1061 days.

(21) Appl. No.: 17/605,036

(22) PCT Filed: Apr. 17, 2020

(86) PCT No.: PCT/EP2020/060871
§ 371 (c)(1),
(2) Date: Oct. 20, 2021

(87) PCT Pub. No.: WO2020/216687
PCT Pub. Date: Oct. 29, 2020

(65) Prior Publication Data

US 2022/0208035 A1 Jun. 30, 2022

(30) Foreign Application Priority Data

Apr. 20, 2019 (DE) ........................ 20 2019 001 774

(51) Int. Cl.

| | |
|---|---|
| ***G09F 21/04*** | (2006.01) |
| ***G09F 9/30*** | (2006.01) |
| ***G09F 9/37*** | (2006.01) |
| ***G09G 3/34*** | (2006.01) |

(52) U.S. Cl.
CPC .............. *G09F 21/04* (2013.01); *G09F 9/301* (2013.01); *G09F 9/372* (2013.01); *G09F 21/048* (2013.01); *G09G 3/348* (2013.01)

(58) Field of Classification Search
CPC .......... G09F 21/04; G09F 9/301; G09F 9/372; G09F 21/048; G09F 9/30; G09G 3/348
See application file for complete search history.

(56) References Cited

U.S. PATENT DOCUMENTS

| | | | | |
|---|---|---|---|---|
| 5,463,827 | A * | 11/1995 | Williams ................ | G09F 9/375 40/449 |
| 9,738,225 | B1 * | 8/2017 | Au ........................... | B60Q 1/50 |
| 10,412,800 | B1 * | 9/2019 | Beattie ...................... | G09F 9/33 |

(Continued)

FOREIGN PATENT DOCUMENTS

| | | |
|---|---|---|
| DE | 600 28 088 T2 | 12/2006 |
| DE | 20 2007 017 477 U1 | 6/2008 |

(Continued)

*Primary Examiner* — Cassandra Davis
(74) *Attorney, Agent, or Firm* — WCF IP

(57) ABSTRACT

A pixel-technological display field for displaying changing motifs is attached to the outside of at least one component of a utility vehicle structure or is structurally integrated in to the at least one component. The display field has a multiplicity of separately controllable display pixels. In an embodiment the display field is self-luminous and produces a light emission that is less than +0.5 cd/m$^2$ in comparison to an averaged, relative ambient light. In an embodiment the display field protrudes from an outer surface of the at least one component by less than 15 mm.

19 Claims, 4 Drawing Sheets

(56) References Cited

U.S. PATENT DOCUMENTS

| | | | | |
|---|---|---|---|---|
| 2006/0209547 A1* | 9/2006 | Biondo | G09F 9/33 | 362/388 |
| 2008/0084360 A1* | 4/2008 | Shingai | G09F 27/00 | 345/1.3 |
| 2009/0019748 A1* | 1/2009 | Rosarius | G09F 21/04 | 40/591 |
| 2010/0043264 A1* | 2/2010 | Johnson, Jr. | G09F 13/22 | 315/149 |
| 2019/0019439 A1* | 1/2019 | Oded | B62D 63/04 | |
| 2019/0027072 A1* | 1/2019 | Labowsky | G09F 21/20 | |

FOREIGN PATENT DOCUMENTS

| | | | |
|---|---|---|---|
| DE | 10 2010 048 933 | A1 | 6/2011 |
| DE | 10 2016 000 765 | A1 | 9/2016 |
| DE | 10 218 220 691 | A1 | 6/2020 |
| EP | 1909254 | A2 | 4/2008 |
| WO | 2020/109228 | A1 | 6/2020 |

* cited by examiner

Fig. 7

Fig. 7a 43: Display cover
("LED cover" / "Repro cover" / "Composite cover" / "Composite reprocover")

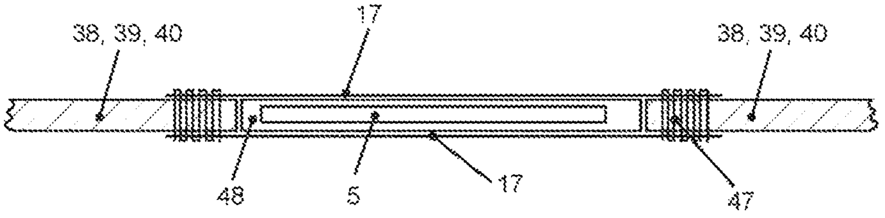

Fig. 7b 43: Display cover
("LED cover" / "Repro cover" / "Composite cover" / "Composite reprocover")

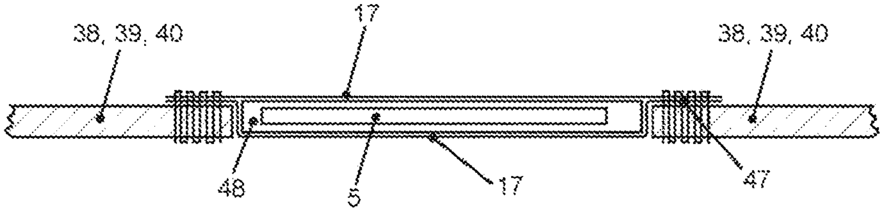

Fig. 7c 43: Display cover
("LED cover" / "Repro cover" / "Composite cover" / "Composite reprocover")

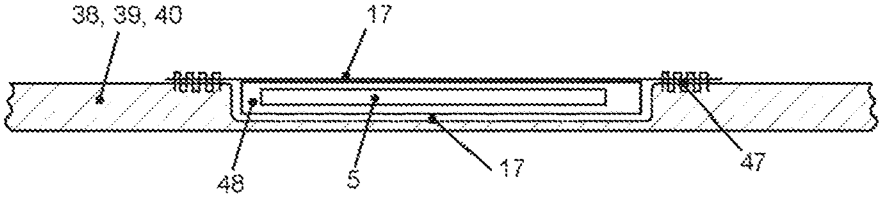

Fig. 7d 43: Display cover
("LED cover" / "Repro cover" / "Composite cover" / "Composite reprocover")

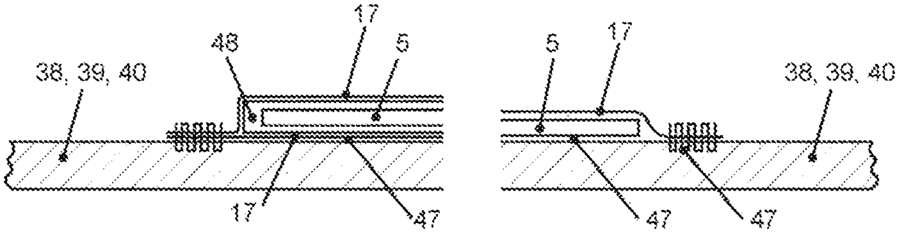

DEVICE FOR A UTILITY VEHICLE STRUCTURE, AND UTILITY VEHICLE STRUCTURE CONSTRUCTED WITH THE SAME

FIELD OF THE INVENTION

The present invention relates to a device for a utility vehicle structure. The invention also relates to a utility vehicle structure having at least one such device. A utility vehicle structure generally denotes structures for utility vehicles, for example structures in the region of a loading space or a loading surface. Depending on the type of utility vehicle, the structures can comprise side, roof and/or rear walls and/or flexible covers. Utility vehicles are, for example, trucks and their trailers or semitrailers.

The present invention relates generally to structures for utility vehicles, such as a truck structure, a trailer structure, a semitrailer structure, a swap body structure, or a fixed motor vehicle structure, and in particular a utility vehicle structure with communication technological side, roof and, for example, rear-side devices. The present invention relates in particular to utility vehicles used for the transport of goods and heavy loads.

BACKGROUND

As already mentioned in the introductory part, the term utility vehicle structure within the scope of the present invention includes, among other things, all truck or trailer structures such as truck structures, trailer structures, and all other structures that are usually provided on the rear side with a cover, with a roll-up door, with a folding door, with a platform, or with a bi-leaf or multi-leaf door.

Structures for utility vehicles with bi-leaf rear wall doors have become established today in particular in the case of utility vehicle structures with sliding covers and box structures, which are paneled with either what are known as plywood panels or other so-called sandwich panels or modules. Furthermore, box structures made of steel are known, the side walls of which consist, for example, of two separate side wall leaves that can be opened separately. For this purpose, the side walls consist of, for example, two separate side wall leaves that are separately hinged at the front and rear sides, wherein the two side wall leaves in this embodiment can also consist of individual side wall segments that can be folded with respect to one another.

The rear wall doors of common utility vehicle structures nowadays usually consist of two separate door leaves, which are each pivotably attached to the outside of the respective corner stanchions via single or double joint hinges so that the two door leaves can be moved into their fully opened position. In order to secure the two separate door leaves in their closed position against unintentional opening, the two separate door leaves are equipped with rod locks or locking rods, which secure the two separate door leaves at the top and the bottom with respect to the utility vehicle structure.

The door leaves themselves are usually made of profiles in aluminum or steel and usually have a sealing lip running all around to protect the loading space against the ingress of water. In addition, an overlapping edge construction in the middle of the portal protects the loading space from excessive entry of environmental influences, like water or dirt. Furthermore, the doors can consist of modular, form-fittingly and/or force-fittingly interlocking system panels, which are then structurally stiffened with frame elements, as is typical of a construction set, and are made to be so stable in terms of security engineering that, as an assembled construction set door, they comply with traffic law and load securing standards and guidelines.

In addition, both the doors and the sides are generally provided with lettering or imprints for advertising purposes, which differ from customer to customer, as a result of which significant costs are involved, but income from advertising for third parties becomes possible and/or is generated.

Another problem inherent in these known side and door solutions is that changing the motif of the above-mentioned lettering on side walls and/or rear wall doors is always very complex and costly; a different customer equals immense costs. If the normal user of truck structures, the freight forwarder, wants to generate additional income by driving with third-party advertising, the freight forwarder generally has to spend several thousand euros per all-around lettering. This investment becomes all the more expensive, the more intact the truck structure is intended to be after every lettering change, since particularly high-quality materials must be used in that case. The latter is especially true if what are known as leasing vehicles or objects are involved; that is to say if the freight forwarder is not the owner of the truck and/or trailer including structure. The same problem naturally also arises if the user is not a freight forwarder but, for example, a manufacturer or distributor.

SUMMARY

The invention is based on the object of making the utility vehicle structure more flexible to use and of providing a corresponding device for this purpose.

This object is achieved by a device for a utility vehicle structure, having at least one component of the utility vehicle structure with a pixel-technological display field for displaying changing motifs, which has a multiplicity of separately drivable display pixels, wherein the display field is attached to the outside of the component or is integrated structurally, e.g. on the outside, into the component. The display pixels are visible here on the outside of the component so that the changing motifs can be presented to a viewer outside the utility vehicle structure. The invention has the advantage that the utility vehicle structure can be expanded to include the possibility of a variable display of motifs, for example for advertising purposes and/or for signaling operating states of the utility vehicle or dangerous situations in the surroundings. By adding such a pixel-technological display field to the component of the utility vehicle structure, display technology that facilitates the changing of motifs, is suitable for displaying substantially any desired changing motifs and can generate, permit and/or ensure motif changes similar to lettering and/or typographical displays is added.

The pixel-technological display field can be implemented, for example, as a display or as a display network with individual display pixels or cells.

The display field or the arrangement of the display pixels can, for example, have a rectangular shape. The display pixels can be arranged in the form of a matrix, distributed two-dimensionally over the surface area of the display field.

The display field can be embodied in the form of a black-and-white display field. In this case, the individual display pixels can be embodied in a single color and thus can be switched only between the states light/dark.

According to an advantageous embodiment of the invention, provision is made for the display field to be embodied in the form of a color display field for displaying colored motifs. In this way, the display field can be used much more universally than with a pure black-and-white display. In particular, all possible motifs can be presented better. To implement the display of colored motifs, the display field can for example have display pixels in different colors, for example according to the RGB color scheme or color system or preferably the CMY or CMYK color scheme or color system. In particular, the display field can be embodied in the form of a color display field with CMY or CMYK electrowetting technology.

According to an advantageous embodiment of the invention, provision is made for the display field to be embodied in the form of a self-luminous display field. The display field is thus embodied in the form of a light-emitting display field. This has the advantage that the motifs on the display field can be presented much more clearly and with improved contrast both in daylight and in the dark. In the case of a colored display in particular, the brilliance of the presentation can be significantly improved.

According to an advantageous embodiment of the invention, provision is made for the display field to have background lighting to increase the contrast of the display pixels and/or self-luminous display pixels. Different technologies can be used to implement the display pixels, preferably the technology of electrowetting (also called e-wetting for short). The individual display pixels can, for example, if they are embodied in the form of self-luminous display pixels, be embodied in the form of light emitting diodes (LEDs) or surface mounted devices (SMDs).

According to an advantageous embodiment of the invention, provision is made for the pixels of the display field to be translucent. This has the advantage that the display field thus corresponds to the reprographic standards of the 20th and 21st centuries, in particular in digital printing, offset printing, and inkjet printing, with the result that maximum color brilliance is produced and ensured with the least possible printed graphic effect of what are known as "muted" colors. Muted colors are colors mixed or blended with black; the impression is then one of darkened brilliance or darkened colorfulness.

According to an advantageous embodiment of the invention, provision is made for the light emission of the display field to be less than +0.5 $cd/m^2$ in comparison with the (relative) ambient light of the utility vehicle. In this way, the strength of the light emission is limited to a level that can be easily accepted in road traffic, in particular without special approval procedures. In particular, although the display field is self-luminous, it can be classified as a non-lighting and non-light-signalling function or device, which means that no approval as a lighting device is required.

According to an advantageous embodiment of the invention, provision is made for the pixel distance between the display pixels of the display field to be at least 1 mm, or at least 1.5 mm, or at least 4 mm. The pixel distance (pitch) between the display pixels is therefore chosen to be comparatively large, which for the display of motifs in the outside area has the advantage that they can be comfortably perceived by viewers from the desired distance, for example from a viewing distance of 5 m. This also means the viewer does not wish to look at the presented motif from a closer viewing distance. Due to the pixel distance, it is no longer possible to perceive the motif meaningfully if the viewing distance is shorter.

According to an advantageous embodiment of the invention, provision is made for the component of the utility vehicle structure to be a door leaf, a side wall, a rear wall, a roof wall, a tail lift, and/or a cover of a utility vehicle structure. Thus, the device according to the invention can be used highly universally at the utility vehicle structure, wherein it is also possible for a plurality of devices of the type mentioned to be used at a utility vehicle structure, for example by embodying the left and right side walls and the rear wall in the form of a device of the type according to the invention, i.e. each being equipped with a pixel-technological display field. It is also particularly advantageous to embody a cover of a utility vehicle structure in the form of a device according to the invention, i.e. to equip it with a pixel-technological display field. Depending on the requirements, a side cover, a rear cover, and/or a roof cover can be equipped with a pixel-technological display field.

According to an advantageous embodiment of the invention, provision is made for the display field to be integrated into the cover or to be attached to the cover, for example by adhesive bonding, welding, and/or sewing. In this way, a digital cover for utility vehicles can be implemented.

It is possible when using the CMY or CMYK color scheme or color system, but also in the special case of using a monochrome, duplex, triplex or quadruplex color scheme or color system, to also use the term composite reprocover in this respect. In particular, e-wetting technology with its translucent color technology should be considered for use in this respect.

According to an advantageous embodiment of the invention, provision is made for the display field to be flexibly preformable, in particular for it to be embodied in the form of a foldable display field. When integrating the display field into a cover, for example, this has the advantage that the cover can be used in the usual way, i.e. it can be folded up or folded to the side for loading and unloading the utility vehicle without this process being hindered by the display field.

By integrating the pixel-technological display field into a rear wall or rear cover, it is possible to implement for example rear advertising on the utility vehicle with changing motifs in the main viewing direction of following road users or recipients.

According to an advantageous embodiment of the invention, provision is made for the display field to be preferably used for static, non-dynamic motifs or typographical images. Furthermore, the fact that the change sequence as such does not generate any dynamic image effects at all, which means that in particular neither the following traffic or following road users nor any other road users may be distracted from the traffic by dynamic display contents or effects, also corresponds to the advantageous embodiment. This type of embodiment of the invention with preferably static, non-dynamic image information or visual contents is therefore used with the described method of presentation to avoid traffic accidents through signage on the utility vehicle.

According to an advantageous embodiment of the invention, provision is made for the display field to have a surface area of at least 1 $m^2$. Accordingly, the display pixels of the display field occupy at least the mentioned area of at least 1 $m^2$.

According to an advantageous embodiment of the invention, provision is made for the display field to make up at least 30%, in particular at least 50% or at least 70%, of the outer surface of the component. This has the advantage that the outer surface of the component can be used to a large extent for presenting the changing motifs by means of the display field. For example, it is advantageous if the display field makes up at least 60%, in particular at least 70%, of the outer surface of the rear-side component and/or the display field makes up at least 30%, in particular at least 50% of the outer surface of the lateral and/or roof-side component (side wall and/or roof).

According to an advantageous embodiment of the invention, provision is made for the display field to protrude from the outer surface of the component by less than 15 mm, in particular less than 10 mm. This has the advantage that the external dimensions of the utility vehicle structure are substantially not changed by the display field, with the result that there is no need at least with regard to the dimensions to comply with special, extended approval conditions.

According to an advantageous embodiment of the invention, provision is made for the display field to be embodied in the form of a one-part or multi-part display field. If the display field is embodied in the form of a multi-part display field, one part of the display pixels can be arranged at a distance from another part of the display pixels of the display field. For example, the multi-part display field can extend over a plurality of components of the utility vehicle structure, for example two adjacent door leaves or a side wall and a rear wall.

The object mentioned in the introductory part is also achieved by a utility vehicle structure with at least one device of the type explained above. Advantageously, the utility vehicle structure can also have a plurality of such devices, for example when a side wall and a rear wall or a plurality of side walls or additionally a roof wall of the utility vehicle is/are expanded to have a pixel-technological display field. In the case of the covers mentioned, it is also possible for a plurality of the covers, for example roof cover, side cover, rear cover, to be expanded by a pixel-technological display field.

According to an advantageous embodiment of the invention, the pixel-technological display field is equipped with a computer or is connected to a computer. The individual pixels of the display field can be controlled by the computer, i.e. the presentation of a motif on the display field and a change between different motifs. If the computer is not part of the display field, it can be attached, for example, to the component of the utility vehicle structure or be integrated therein. The computer can also be arranged separately at the utility vehicle. The computer can be connected to a remote data transmission device via which the computer can remotely receive control commands and/or signage data that contain the motifs to be displayed on the display field. The change of motifs, for example, can be controlled remotely using the control commands. For this purpose, provision is made, for example, for remote data transmission tunnels that are secured against unauthorized access to be used in an operator-active and/or device-active manner between the operator controlling and transmitting data and the data-receiving computer. The computer can be embodied in the form of a commercially available personal computer (PC), for example a mini PC. The on-board computer can advantageously be switched on and/or switched off independently of any persons or automatically, with the result that it is avoided that the vehicle battery has insufficient energy to start the vehicle and/or that transport-relevant units such as cooling units have insufficient power. The computer can also be described as a signage computer. The signage unit is advantageously separated from the computer's operating system in order to ensure that only signage data are displayed on the display field. For this purpose, the computer advantageously has an integrated or connected signage player and/or an integrated or connected router with an integrated or connected SIM card reader or interface including a SIM card with or without an active SIM card communication contract or an alternative location-independent, non-hardware-connected communication option between the data-managing or signage-managing operator and the computer. Functional unit modules for computers, players, and routers are preferably provided for signage operation that is as secure against access and trouble-free as possible; routers with an integrated SIM card slot have become established on the market independently of signage applications.

According to an advantageous embodiment of the invention, provision is made for the light emission of the display field to be less than 0.5 cd/m$^2$ in comparison with the (relative) ambient light. For this purpose, provision is made for at least one light sensor per vehicle side equipped with a display field to be installed, for example, parallel to the main light emission axis on the same vehicle side, so that the computer can be supplied with the ambient light data that are relevant to the device system and in this way can adapt the light emission of the display field according to the ambient light.

In order to generate suitable data regulating the pixel luminosity, an advantageous embodiment of the invention makes provision for a special software or app to ensure the adjustment of the luminosity of the pixels of the display field such that the pixels are controlled with less than 0.5 cd/m$^2$ light emission with respect to the ambient light.

In order to generate suitable data regulating the pixel color contrasts, an advantageous embodiment of the invention makes provision for a further special software or app to ensure the color contrast adjustment of the pixels of the display field such that the pixels generate colors according to the relative ambient light conditions in a manner such that the pixels are controlled with less than 0.5 cd/m$^2$ with respect to the ambient light, and, additionally, colors are generated that neither achieve a signal effect nor avoidably distract from the traffic.

To generate suitable data regulating the pixel colors, provision is likewise made according to an advantageous embodiment of the invention for a further special software or app to ensure the color adjustment of the pixels of the display field such that the pixels generate colors according to the relative ambient light conditions such that the pixels are controlled with less than 0.5 cd/m$^2$ with respect to the ambient light, and in addition colors are generated that neither achieve a signal effect nor avoidably distract from the traffic.

With regard to the software or apps for adjusting the luminosity of the pixels of the display field and also for adjusting the color contrast of the pixels of the display field and also for adjusting the color of the pixels of the display field, it is advantageously also possible to use only one software or app or fewer than three pieces of software or apps.

DESCRIPTION OF THE DRAWINGS

FIG. 7*a* shows an exemplary embodiment where both protective films are attached to different sides of the cover.

FIG. 7*b* shows an exemplary embodiment in which both protective films are attached to the same side of the cover.

FIG. 7*c* shows an exemplary embodiment in which a recess in the cover is not made continuous, but rather in the manner of a blind hole.

FIG. 7*d* shows an exemplary embodiment of a display field on the outer surface of a cover.

DETAILED DESCRIPTION

Figure 1:
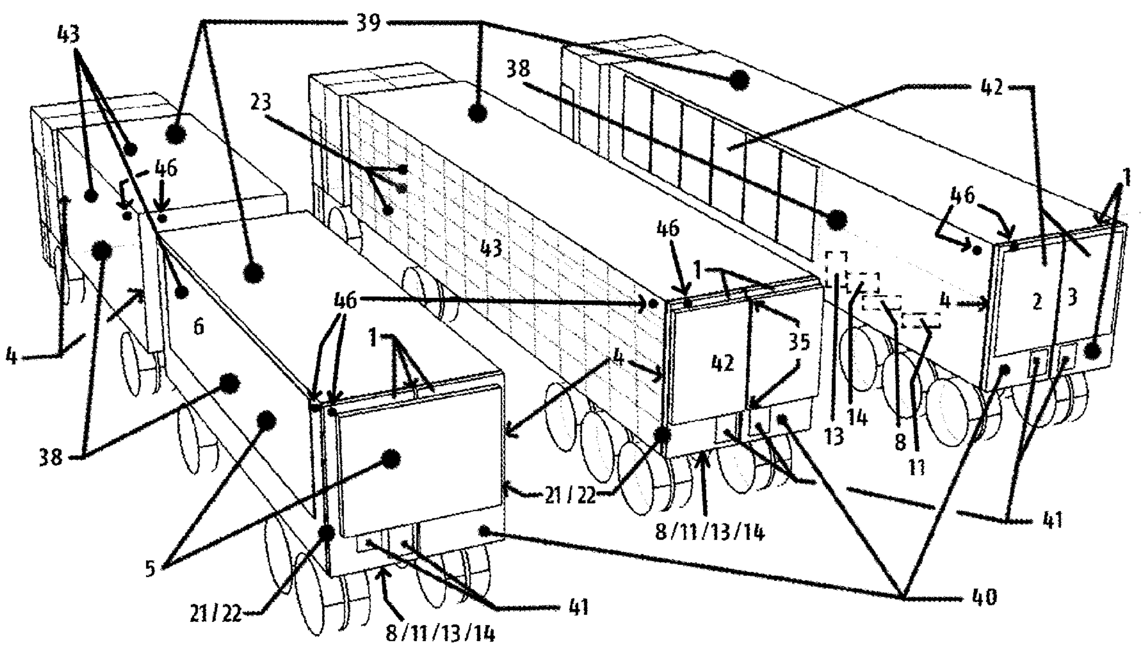
FIG. 1 is a perspective of over various utility vehicle structures in a perspective view from the rear side.

The invention makes it possible to provide a utility vehicle structure whose rear wall door can be opened as completely as possible even in tight spaces and which causes lower costs in terms of production, especially for the lettering and changing the lettering of the rear wall door, but also in the case of the side walls—regardless of whether it is a cover or box or other types of structures—at least cumulatively over the total usage time of the truck and/or trailer or its structures.

To solve these problems inherent in the known rear wall portals and side wall structures, a communication-technological door device in which a display integrated into the structure replaces, for example, the lettering is proposed according to a first exemplary embodiment of the present invention. For example, any costs for lettering are consequently reasonably and expediently incurred only once, since the display does not require any further new lettering or re-lettering including associated and resulting post-treatments. The use of a display, e.g. in the rear doors, eliminates the need for costly lettering or printing and also for any necessary repair and/or rework costs, which would occur, for example, if the original surface was damaged when the lettering was changed, for example due to irregular surface damage such as tearing out surface components or sections, for example in the case of sealing coatings or varnishes, or scratching the surfaces through the use of tools and/or hand protection measures in order to remove the previous lettering. In the context of this application, "display" is used to denote in representative fashion any communication-technological display surface and/or technology that is not analog but digital in terms of lettering; for example, LED, electrowetting, and other, in particular future, visualization technologies that structurally tend to have a pixel-technological structure or to be a display.

An integrated display, for example, can also replace the lettering on the sides of truck and/or trailer structures, for example covers or box structures. Here, too, the same investment, cost, and surface advantages as described above for the rear doors arise.

The e.g. integrated utility vehicle structure display in the roof, side or rear walls is intended to be a communication-technological substitute for the standard customary and typical roof, side wall, and/or rear lettering. The recipient's impression should be as similar as possible to that of conventional lettering systems by means of analog lettering; especially with regard to the luminous intensity. The digital utility vehicle structure lettering by means of a display is intended to replace the customary lettering on the rear, roof, and/or side walls as far as possible, and should in no way generate a signal effect in the sense of vehicle illumination and/or identification.

The e.g. integrated utility vehicle structure display on the rear, roof, or side walls should therefore ensure contrasts depending on the ambient light, which, in terms of the recipient's superficial impression, is, for example, very similar to or approximates the impression of conventional analog lettering.

The e.g. integrated utility vehicle structure display in the rear, roof, or side walls in the form of a structurally matrix-like grid is intended to offer additional protection against tearing of vehicle structure covers, which provides additional support for the devices which comply with the guidelines against deliberate external influences by third parties that damage or destroy the cover; and may therefore be considered eligible expenditures.

The e.g. integrated utility vehicle structure display in the rear, roof, or side walls of utility vehicle structures is intended to offer a significant added value overall for the users of vehicle structures, and in particular for freight forwarders. Freight forwarders in particular are burdened by increasing cost pressure from fuels, but also by increasing regulatory pressure from public institutions, and as a result, drivers are affected by increasingly poor labor and freight forwarding market conditions. The option of receiving income in particular from digitalized marketing for advertising third parties, which is quite relevant nowadays, can represent and bring with it for workers in the freight forwarding industry a considerable and significant relief or compensation in terms of the cost pressures caused by the freight forwarding market, which cannot be provided to this extent by anyone else, especially not by the public sector or, for example, charities, cooperatives, or trade unions.

In the context of this patent list, "display" is used to denote in a representative fashion any communication-technological display surface and/or display technology that is not designed in an analog manner in terms of lettering, but, for example, a digital LED, e-wetting, and/or other, including future visualization technology that is structural or tends to have a pixel-technical structure or be a display. Such a pixel-technological display-based network or display is used to generate graphic and/or typographic information and can have a modular system architecture—such displays can therefore be one-part and/or multi-part.

Further advantageous embodiments 1 to 44 of the invention will be given below in the form of bullet points, wherein each of the embodiments can be combined with one another as desired.

1. Utility vehicle structure with display technology that facilitates motif change, for side, roof, and/or rear walls (38, 39, 40) with or without a loading portal (1) and at least two horizontal or vertical door leaves (2, 3) that are pivotable relative to one another for closing a loading portal (1), wherein a pixel-technological display field is mounted, which is integrated into at least one portal door leaf or a rear wall segment or at least one side wall segment or at least one roof segment, and generates, allows, and/or ensures motif changes similar to lettering work and/or typographical displays.

2. Utility vehicle structure according to embodiment 1, characterized in that at least one door leaf (2, 3) has apparatuses for at least one, better two, locking rods (24).

3. Utility vehicle structure according to at least one of the embodiments 1 and 2, characterized in that the pixel-technological display field used extends over at least two door leaves.

4. Cover for a utility vehicle structure (43) according to at least one of the embodiments 1 and 2, characterized in that the pixel-technological display field used is integrated in the cover by way of composite technology. Such a utility vehicle structure cover could for example be referred to as an LED cover or a composite reprocover.

5. Utility vehicle structure according to at least one of the embodiments 1 to 4, characterized in that the pixel-technological display field used is provided with at least one suitable apparatus (17) that protects the pixel-technological display field against physical environmental influences such as falling rocks, water, and/or accelerated liquids.

6. Utility vehicle structure according to at least one of the embodiments 1 to 5, characterized in that the display or display network used is provided with at least one suitable apparatus (11, 17, 18, 29, 34) that protects the pixel-technological display field against environmental influences, such as water or rain.

7. Utility vehicle structure according to at least one of the embodiments 1 to 6, characterized in that the pixel-technological display field used is provided with at least one suitable apparatus (15, 29) that protects the pixel-technological display field against overheating.

8. Utility vehicle structure according to at least one of the embodiments 1 to 7, characterized in that the pixel-technological display field used is provided with at least one suitable apparatus that protects the pixel-technological display field against environmental influences such as strong or extreme cold.

9. Utility vehicle structure according to at least one of the embodiments 1 to 8, characterized in that the pixel-technological display field used is provided with at least one suitable apparatus (28, 16) that protects the pixel-technological display field against physical environmental or vicinity influences such as direct shocks or vibrations.

10. Utility vehicle structure according to at least one of the embodiments 1 to 9, characterized in that the pixel-technological display field used is provided with at least one suitable apparatus (15, 16, 17) that protects the pixel-technological display field against physical environmental influences such as excessive humidity.

11. Utility vehicle structure according to at least one of the embodiments 1 to 10, characterized in that the pixel-technological display field used is provided with at least one suitable apparatus that makes the pixel-technological display field modularly repairable or restorable in the event of pixel errors.

12. Utility vehicle structure according to at least one of the embodiments 1 to 11, characterized in that the pixel-technological display field used is provided with at least one suitable apparatus (26, 27) that constructively connects the pixel-technological display field to the door in a manner such that the pixel-technological display field cannot separately fall out or off.

13. Utility vehicle structure according to at least one of the embodiments 1 to 12, characterized in that the pixel-technological display field used has what is known as the 16:9 format.

14. Utility vehicle structure according to at least one of the embodiments 1 to 12, characterized in that the pixel-technological display field used is what is known as a large-format display.

15. Utility vehicle structure according to at least one of the embodiments 1 to 14, characterized in that the pixel-technological display field used utilizes the rear wall surface to fill the format as fully as possible without at least partially or completely covering, displacing or rendering unrecognizable surfaces or signs (41) that should be kept free for legal identification purposes.

16. Utility vehicle structure according to at least one of the embodiments 1 to 15, characterized in that the pixel-technological display field used displays signs and notices required for legal identification purposes in accordance with guidelines or in accordance with the law in a manner such that previously conventional, analog identification or presentation is at least adequately substituted.

17. Utility vehicle structure according to at least one of the embodiments 1 to 16, characterized in that the pixel-technological display field used is designed in one or more parts.

18. Utility vehicle structure according to at least one of the embodiments 1 to 17, characterized in that the one-part or multi-part pixel-technological display field used is attached to at least one rear door and/or one door leaf (2, 3, 40).

19. Utility vehicle structure according to at least one of the embodiments 1 to 17, characterized in that the one-part or multi-part pixel-technological display field used is attached to at least one side wall segment (38).

20. Utility vehicle structure according to at least one of the embodiments 1 to 17, characterized in that the one-part or multi-part pixel-technological display field used is attached to at least one cover.

21. Utility vehicle structure according to at least one of the embodiments 1 to 20, characterized in that the one-part or multi-part pixel-technological display field used is attached to the roof surface or roof cover.

22. Utility vehicle structure according to at least one of the embodiments 1 to 21, characterized in that the pixel-technological display field used is integrated in the manner of a composite as what is known as a sandwich product in the side, roof, and/or rear surface.

23. Sandwich product in the side, roof, and/or rear surface for a utility vehicle structure according to at least one of the embodiments 1 to 22, characterized in that the display field components structurally and constructively replace the mesh-type, so-called theft or vandalism protection (23, 38) for covers and/or, proceeding therefrom, ensure said protection in a supportive and/or directly constructively form-fitting and/or force-fitting manner.

24. Pixel-technological display field for a utility vehicle structure according to at least one of the embodiments 1 to 23, characterized in that said display field is designed to be as flat as possible, as what is known as a sandwich product in composite construction, in the side, roof, and/or rear surface, that is to say is designed for example with a clear structural height of approx. 5-10 millimeters, so that, in the “cover” embodiment, the latter may optionally continue to be functionally used as a cover.

25. Pixel-technological display field for a utility vehicle structure according to at least one of the embodiments 1 to 24, characterized in that it has a transparent display pixel protection (34) that is as flat and/or robust as possible and preferably has a clear structural height of approx. 1-5 millimeters; for example made of glass, resin, or plastic.

26. Pixel-technological display field for a utility vehicle structure according to at least one of the embodiments 1 to 25, characterized in that it has suitable apparatuses against impacts of all kinds (36), for example when opening or closing. For example, by means of nubs, strips or welts made of rubber, silicone or the like in terms of function.

27. Pixel-technological display field for a utility vehicle structure according to at least one of the embodiments 1 to 26, characterized in that it has at least one suitable apparatus (37) for preventing the ingress of lubricant for locking rods (24) or other substances hazardous to the trouble-free operation of the display or the display network. For example tubular encapsulation or tubes of all kinds or the like in terms of function.

28. Utility vehicle structure according to at least one of the embodiments 1 to 26, characterized in that it has at least one suitable apparatus (37) for preventing the ingress of lubricant for locking rods (24) or other substances hazardous to the trouble-free operation of the pixel-technological display field. For example tubular encapsulation or tubes of all kinds or the like in terms of function.

29. Utility vehicle structure according to at least one of the embodiments 1 to 28, characterized in that it has at least one suitable apparatus (17, 18, 27, 29) for preventing unauthorized intervention, use, installation/removal, assembly/removal of all kinds.

30. Utility vehicle structure according to at least one of the embodiments 1 to 29, characterized in that at least one door leaf (2) is articulated on a corner stanchion (4) of the loading portal (1), at least one further door leaf (3) is articulated (21, 22).

31. Utility vehicle structure according to at least one of the embodiments 1 to 30, characterized in that door leaves (2, 3) are detachable for example centrally with respect to a loading portal (1).

32. Utility vehicle structure according to at least one of the embodiments 1 to 30, characterized in that, in the case of an at least two-element display field architecture (5, 42), the display field complete modules are articulated to one another and/or are connected so as to be foldable with respect to one another by means of at least one hinge (35).

33. Utility vehicle structure according to at least one of the embodiments 1 to 31, characterized in that the pixel-technological display field can be or is attached to the material of at least one side wall (38), for example to a cover.

34. Apparatus for a utility vehicle structure according to at least one of the embodiments 1 to 33, characterized in that it ensures the visual or optical capturing of vehicle license plates in the immediate vicinity.

35. Utility vehicle structure according to at least one of the embodiments 1 to 31, characterized in that the pixel-technological display field is mounted on suitable utility vehicle structure walls in a traffic-safe manner.

36. Double frame construction according to embodiment 9, characterized in that it has an inner frame (45) and an outer frame (18), wherein the one-part or multi-part display is fixed to the inner frame, between the inner frame and outer frame, oscillating rubber buffers—preferably so-called type A rubber-bonded metals (28) with threaded bolts on both sides—are mounted, and in that the outer frame is fixedly mounted together with the utility vehicle structure.

37. Seal between the display (5) and display pixel protection (34) according to embodiments 6 and 25, characterized in that it remains permanently flexible and sealing both thermally and physically and also volumetrically and also when in contact with solvent, soap, caustic and fuel mixtures of all types, so that both the display pixels and the entire device including computers and other units and also data-containing and current-carrying parts are not damaged, in particular in the case of vibrations and shocks in traffic and during normal washing processes, and/or moisture or liquids cannot penetrate the interior of the device; that is to say preferably consist of foam rubber, FKM or EPDM.

38. Light sensor system for ambient light measurement or ascertainment of the ambient light conditions for vehicle structures according to at least one of the embodiments 1 to 37, characterized in that at least one light sensor (46) is mounted per vehicle side provided with a display, which light sensor passively or actively supplies the ascertained, average ambient light values to the computer described above or to the software or app described above for adjusting and regulating the luminosity.

39. Software or app for at least one of the embodiments 1 to 38, characterized in that it ensures the computational combination of the environmental light data for the optimum display pixel control with regard to the luminosity.

40. Software or app for at least one of the embodiments 1 to 39, characterized in that it ensures the computational combination of the environmental light data for the optimum display pixel control with regard to color contrasts and/or colors.

41. Software or app for at least one of the embodiments 39 and 40, characterized in that it ensures a calculation of the optimum display pixel control with regard to the fact that neither signal colors nor any light-technical signal effects are generated; this includes in particular lighting, light color and/or color target value tables with or without tolerances, which ensure a corresponding pixel controller calibration.

42. Pixel controller for at least one of the embodiments 1 and 41, characterized in that it ensures the optimum display pixel control in terms of display luminosity with maximum ambient luminosity plus less than 0.5 cd, and also in that neither signal colors nor any light-technical signal effects are generated; this includes, in particular, the corresponding calibration in terms of lighting, light color and/or color.

43. Composite reprocover according to at least one of the embodiments 1 to 42, characterized in that a translucent display pixel color technology—such as electrowetting with ionizable colored oil droplets—is processed with the cover in a composite manner such that the visual impression that the cover and display technology are one in terms of composition or object technology is created and/or ensured.

44. Composite reprocover (43) according to at least one of the embodiments 1 to 43, characterized in that the display is partially, modularly or entirely processed with the cover in a composite manner in a translucent cell or encapsulation in a manner such that the visual impression that the cover and display technology are at least almost one in terms of composition and object technology is created and/or ensured.

FIG. 1 shows, by way of example, various types of utility vehicles with respective utility vehicle structures in a perspective view from the rear side.

Figure 2:
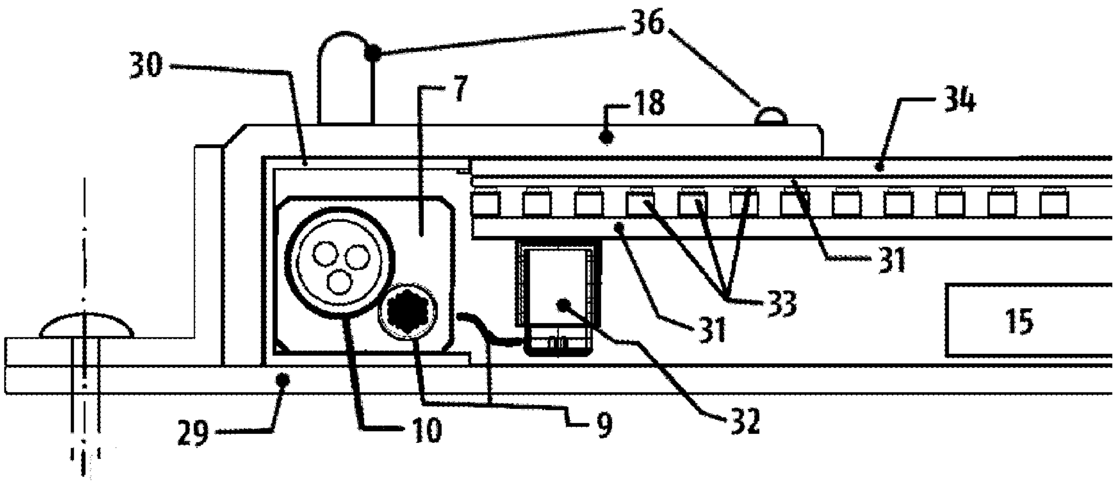
FIG. 2 is a side sectional view of a display field, in which a multiplicity of LEDs or SMDs are arranged as display pixels on a module.

FIG. 2 shows, by way of example, a side sectional view of a display field, in which a multiplicity of LEDs or SMDs 33 are arranged as display pixels on a module 31. On the side on which motifs can be presented by the display field, a display pixel protection 34 is fastened over the display field. The display field is fixed by a display frame 18, which is connected to a display rear wall 29. In addition, display protection elements 36 may be present. The display field can be supplied with data and power via an interface 32, for example via a cable 9 from a data unit 7, which has connections for a data line and a power cable 10. A cooling fan 15 can be installed in the vicinity of the display field for cooling.

Figure 3:
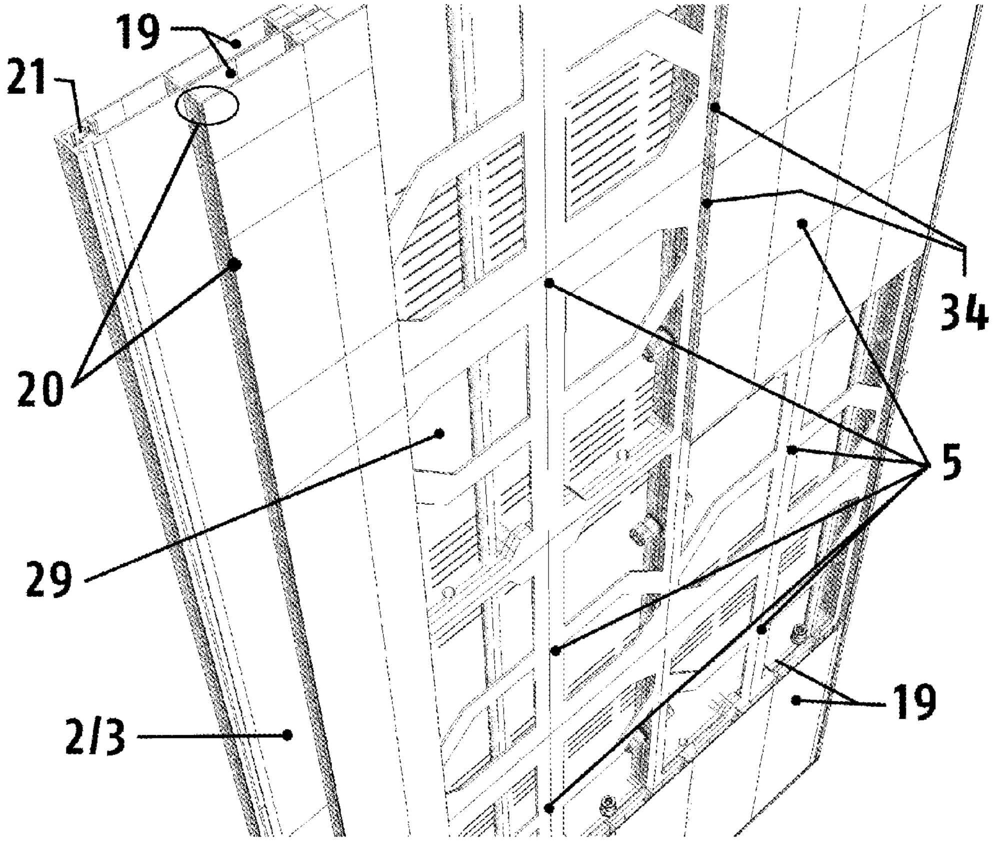
FIG. 3 is a perspective illustration of the installation of a display unit.

FIG. 3 shows a perspective illustration of the installation of a display unit explained on the basis of FIG. 2 on door or wall panels 19 of a utility vehicle structure.

Figure 4:
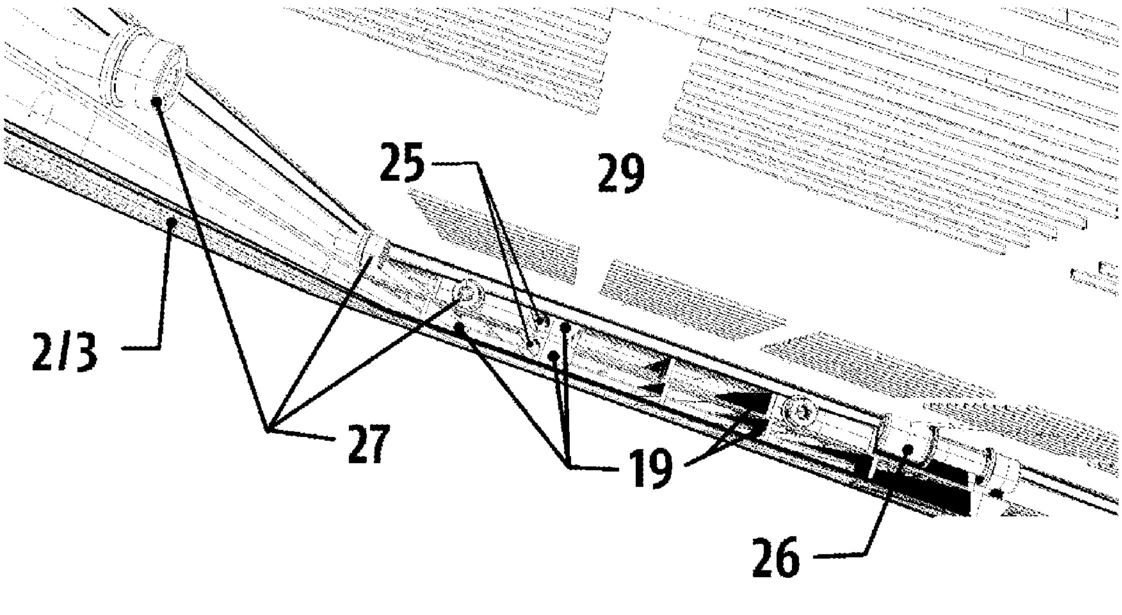
FIG. 4 is a perspective illustration, based on door leaves, fixing screws, and connecting screws 26 for attaching a display field.

FIG. 4 shows a perspective illustration, based on door leaves 2, 3, fixing screws 27 and connecting screws 26 for attaching a display field.

Figure 5:
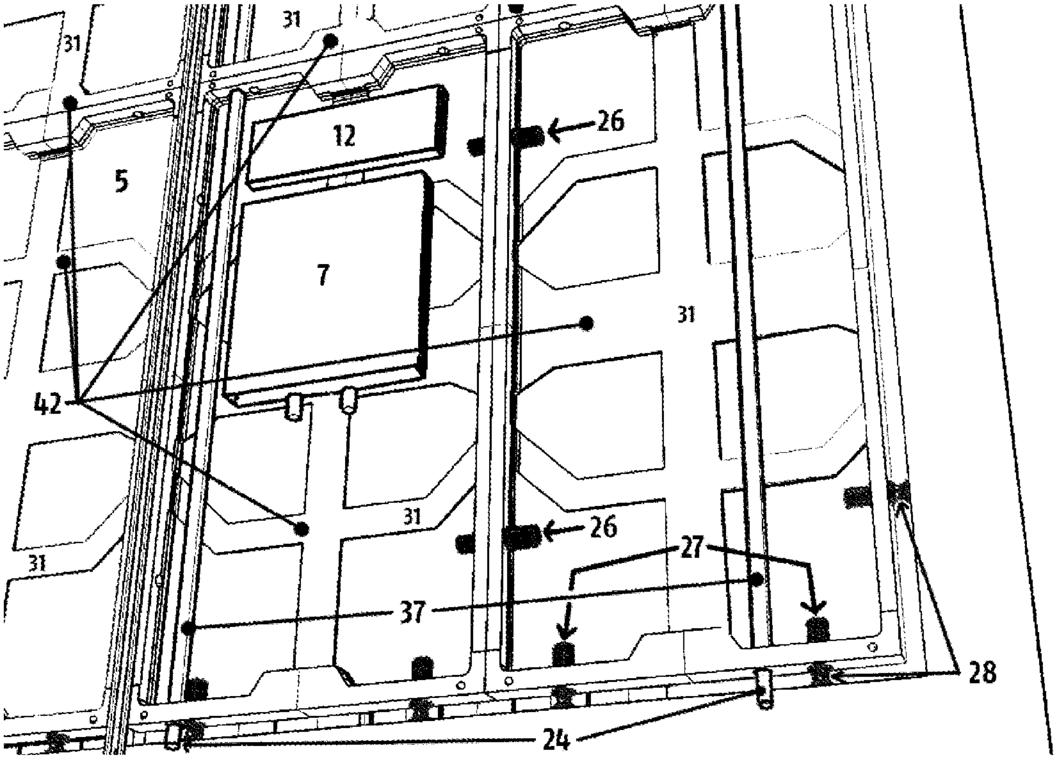
FIG. 5 is a perspective illustration showing the attachment of a data unit to a component of a utility vehicle structure.

FIG. 5 additionally shows, in a perspective illustration the attachment of a data unit 7, for example with a computer, and of a power converter 12 to a component of a utility vehicle structure.

Figure 6:
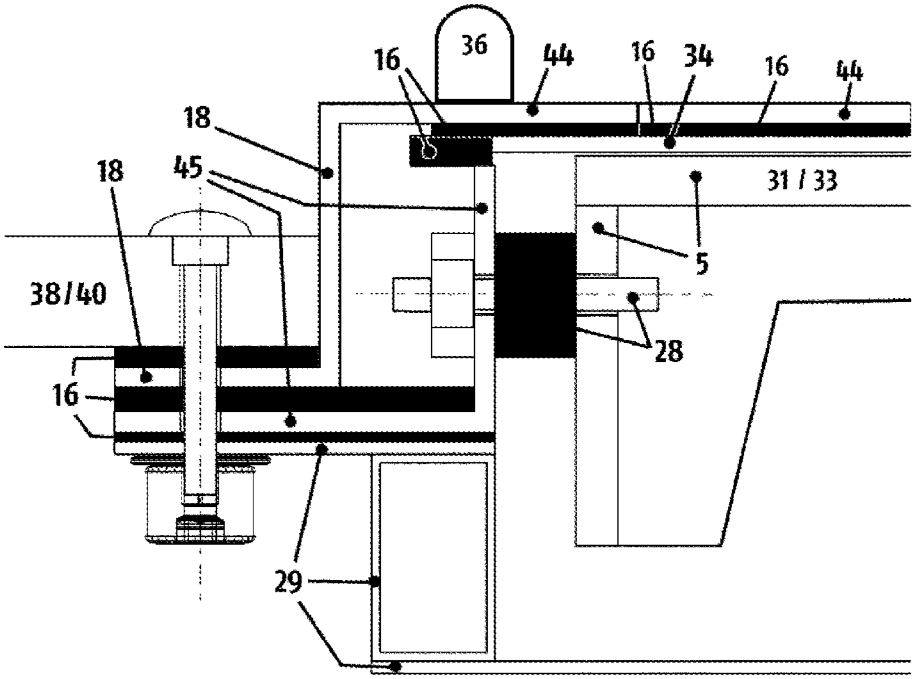
FIG. 6 is a side sectional illustration showing a vibration-damped attachment of a pixel-technological display field.

FIG. 6 shows, in a side sectional illustration, an advantageous, vibration-damped attachment of a pixel-technological display field, for example on a side wall 38 or a rear wall 40 of a utility vehicle structure. The display field 5 is encapsulated with respect to the inside of the vehicle structure via a display rear wall 29. On the front side, on which motifs can be presented by the display field, the latter is covered by a display pixel protection 34. The latter is structurally fixed with the screen 44 of the outer frame 18 to the panels 19 of the rear wall 40 or side walls 38 in terms of damping technology. The vibration damping and the tightness of the structure are realized by rubber seals 16 and rubber-bonded metals or shock absorbers 28.

FIG. 7 shows different embodiments of the attachment of a pixel-technological display field 5 to a cover 38, 39, 40. For example, the cover can have a continuous recess in which the display field 5 is arranged. The display field 5 is covered by a respective protective film 17 on both sides of the cover. The protective films 17 are connected to the cover 38, 39, 40 via material connections 47 (FIG. 7*a*). In addition, the display field can be encapsulated in an extra display cell 48.

While in the embodiment of FIG. 7*a* both protective films 17 are attached to different sides of the cover, FIG. 7*b* shows an embodiment in which both protective films 17 are attached to the same side of the cover, for example to the outside, by means of the material connections 47 on the cover 38, 39, 40.

FIG. 7*c* shows an embodiment in which the recess in the cover is not made continuous, but rather in the manner of a blind hole. A certain layer thickness of the cover thus remains throughout, which means that the cover continues to be sealed. In this case, the display field 5 can either be covered with a protective film 17 on only one side, or, as shown in FIG. 7*c*, similar to the variant according to FIG. 7*b*, with a front and a rear protective film 17. The protective films 17 are then in turn connected to the cover 38, 39, 40 via the material connections 47.

FIG. 7*d* shows the arrangement of a display field 5 on the outer surface of a cover 38, 39, 40. In this case, the cover does not have to be prepared with a recess. Instead, the display field 5 can simply be placed on the surface of the cover. Here, too, it is advantageous to cover the display field 5 in each case on the front side and the rear side with a protective film 17. The protective films 17 are in turn connected to the cover 38, 39, 40 via material connections 47.

LIST OF REFERENCE SIGNS

1 Loading portal
2 Door leaves
3 Door leaves
4 Corner stanchions
5 Display
6 Display network
7 Data-unit/box display
8 Power distributor
9 Data cable/line
10 Power cable/line
11 Data-unit/-box truck
12 Power converter
13 Truck power distributor
14 Battery
15 Cooling fan/ventilation
16 Rubber seal (e.g. foam rubber, FKM, EPDM)
17 Protective film (water, liquids, falling rocks, dust, dirt, ice)
18 Display frame (outer frame, screen)
19 Door panel/panels or wall panel/panels
20 Panel overhang/frame
21 Hinge
22 Double-jointed hinge
23 Theft/vandalism protection
24 Locking rod
25 Recess for locking rod
26 Connecting screw/s
27 Fixing screw/s
28 Rubber-bonded metal/shock absorbers
29 Display rear wall (possibly with air slots or holes)
30 U-profile
31 LED module/E-wetting module
32 LED module interface data+power
33 LED/SMD
34 Display pixel protection (glass, resin, plastic; film)
35 Display hinge
36 Display protection (nub, strip, welt)
37 Locking rod encapsulation (tube)
38 Side/side cover/side wall/side section
39 Roof/roof cover/roof wall/roof section
40 Rear/rear cover/rear wall/rear section
41 Legal identification signs
42 Multi-element display with complete display modules
43 Display cover ("LED cover"/"reprocover"/"Composite reprocover")
44 Screen of the outer frame
45 Inner frame (for receiving display)
46 Light sensor
47 Material connection (e.g. welding, adhesive bonding, seam, riveting)
48 Display cell (for "reprocover"/"composite reprocover"/"composite cover"/"LED cover")

The invention claimed is:

1. A device for a utility vehicle structure, comprising:
at least one component of the utility vehicle structure;
at least one light sensor for ascertainment of averaged ambient light values; and
a pixel-technological display field for displaying changing motifs, wherein the display field has a multiplicity of separately controllable display pixels, wherein the display field is attached to an outside of the at least one component of the utility vehicle structure or is structurally integrated into the at least one component of the utility vehicle,
wherein the display field is a self-luminous display field,
wherein luminosity of the pixels of the display field is adjusted such that the display field produces light emission that is less than +0.5 cd/m$^2$ relative the averaged ambient light values.

2. The device as claimed in claim 1, wherein the display field is a color display field for displaying colored motifs.

3. The device of claim 2 wherein the color display field comprises CMY or CMYK electrowetting technology.

4. The device as claimed in claim 1, wherein the display field has background lighting for illuminating non-self-luminous display pixels and/or self-luminous display pixels of the separately controllable display pixels.

5. The device as claimed in claim 1 wherein a pixel distance between the separately controllable display pixels of the display field is at least 1 mm.

6. The device as claimed in claim 1 wherein the at least one component to which the display field is attached or to which the device is structurally integrated is selected from the group consisting of a door leaf, a side wall, a rear wall, a roof wall, a tail lift, and a cover of the utility vehicle structure.

7. The device as claimed in claim 6, wherein the display field is integrated into the cover or is attached to the cover.

8. The device as claimed in claim 7 wherein integration or attachment is performed by an operation selected from the group consisting of adhesive bonding, welding, and sewing.

9. The device as claimed in claim 1 wherein the display field is flexibly preformable.

10. The device of claim 9 wherein the display field is foldable.

11. The device as claimed in claim 1 wherein the display field has an area of at least 1 $m^2$.

12. The device as claimed in claim 1 wherein the display field is embodied in a form of a non-lighting and non-light-signalling function.

13. The device as claimed in claim 1 wherein the display field is embodied in the form of a one-part or multi-part display field.

14. The device of claim 1 wherein a pixel distance between the separately controllable display pixels of the display field is at least 4 mm.

15. The device according to claim 1 wherein the at least one light sensor is facing in a same direction as and parallel to a main light emission axis of the display field.

16. A device for a utility vehicle structure, comprising:

at least one component of the utility vehicle structure; and a pixel-technological display field for displaying changing motifs, wherein the display field has a multiplicity of separately controllable display pixels, wherein the display field is attached to an outside of the at least one component of the utility vehicle structure or is structurally integrated into the at least one component of the utility vehicle, wherein the display field protrudes from an outer surface of the at least one component, wherein the display field protrudes from the outer surface of the at least one component by less than 15 mm.

17. The device according to claim 16 further comprising at least one sensor for sensing ambient light wherein the at least one sensor is facing in a same direction as and parallel to a main light emission axis of the display field.

18. A device for a utility vehicle structure, comprising:

at least one component of the utility vehicle structure;

at least one light sensor for ascertainment of averaged ambient light values; and a pixel-technological display field for displaying changing motifs, wherein the display field has a multiplicity of separately controllable display pixels, wherein the display field is attached to an outside of the at least one component of the utility vehicle structure or is structurally integrated into the at least one component of the utility vehicle, wherein the display field is a self-luminous display field, wherein luminosity of the pixels of the display field is regulated relative the averaged ambient light values.

19. The device according to claim 18 wherein the display field is configured to approximate an impression of conventional analog lettering with regard to the luminosity.

* * * * *